United States Patent [19]
Mitchell et al.

[11] Patent Number: 5,498,702
[45] Date of Patent: Mar. 12, 1996

[54] TREATED PECTINIC ACID PROCESS AND PRODUCT

[75] Inventors: Cheryl R. Mitchell; Pat R. Mitchell, both of Stockton, Calif.

[73] Assignee: California Natural Products, Lathrop, Calif.

[21] Appl. No.: 169,377

[22] Filed: Dec. 16, 1993

[51] Int. Cl.$^6$ .............................. C08B 37/06; C08B 37/04
[52] U.S. Cl. ................... 536/2; 536/3; 536/114; 536/127
[58] Field of Search ..................... 536/2, 3, 114, 536/127

[56] References Cited

U.S. PATENT DOCUMENTS

| | | | |
|---|---|---|---|
| 2,156,223 | 4/1939 | Myers | 260/344 |
| 2,729,633 | 1/1956 | Album et al. | 536/2 |
| 3,743,518 | 7/1973 | Eisenstadt et al. | 99/141 |
| 4,690,827 | 9/1987 | Kupper et al. | 426/548 |
| 5,008,254 | 4/1991 | Weibel | 536/2 |

*Primary Examiner*—Nathan M. Nutter
*Attorney, Agent, or Firm*—Albert C. Smith

[57] ABSTRACT

A process for manufacturing a treated polyuronic acid. The process involves heating an aqueous dispersion of a polyuronic acid, such as a pectin, at a temperature above about 100° C. for an amount of time sufficient to obtain a hydrolyzed, or treated, polyuronic acid mixture which separates upon standing and cooling into a clear solution, which is the hydrolyzed polyuronic acid phase, and a precipitate. The hydrolyzed polyuronic acid phase includes at least 25% of the polyuronic acid substance polymers having a degree of polymerization (DP) in the range of about DP1 to about DP20. The hydrolyzed polyuronic acid, or the treated polyuronic acid, then is recovered for use in a food product.

19 Claims, No Drawings

TREATED PECTINIC ACID PROCESS AND PRODUCT

BACKGROUND OF THE INVENTION

1. Field of the Invention

The present invention relates generally to the field of food sweetener compositions, and relates specifically to the field of processes for manufacturing pectinic acid food sweetener compositions.

2. Description of Background Art

Aspartame is a non-nutritive sweetener that is 160 times sweeter than sucrose in aqueous systems. Because of its sweetness intensity, it is utilized in beverage systems at levels of between 5 mg percent and 200 mg percent by weight as a replacement for sucrose or other nutritive carbohydrates to produce a "low sugars" or "low-calorie" product. Almost three-fourths of all aspartame sales are made to the diet beverage industry.

The diet beverage industry, and more specifically the carbonated diet beverage industry, has preferentially utilized aspartame as the non-nutritive artificial sweetener. One drawback of aspartame is that many people detect a lingering aftertaste, frequently described as "metallic" or "bitter". Those people who detect an aftertaste with aspartame, and who currently do not consume the beverage because of the aftertaste, represent a substantial market. A low calorie product that does not possess the negative aftertastes perceived with aspartame potentially could gain a significant market share.

Chemical substances that diminish or eradicate the lingering aftertaste caused by aspartame, may be considered a food additive and therefore require FDA approval. Thus, compounds that already are considered GRAS (Generally Regarded As Safe) or are already approved by the FDA as a food additive, are preferable over those substances that must still go through the FDA review process.

Since the introduction of aspartame, many researchers have attempted to reduce the aftertaste using a variety of substances with limited success. One example is described in U.S. Pat. No. 4,690,827 to Kupper, et al. That patent discloses a process for increasing pulp volume (pulp composed of either homogenized fruit pulp, cellulose, or a cellulose/pectin material) in artificially sweetened beverages containing fruit juices. It was found that the increased pulp volume of reduced size apparently decreases the aftertaste of non-nutritional sweeteners, including aspartame, saccharine and cyclamate. The mechanism by which the aftertaste of these artificial sweeteners was diminished was not discussed other than the importance of increased pulp volume and decreased fruit pulp particle size. The increased pulp volume apparently had the same effect on all different types of artificial sweetener.

Plant cell wall material is a source of natural food ingredients used as thickeners and emulsifiers. Such plant cell wall material is composed of a broad group of polysaccharide compounds sometimes referred to as the hemicelluloses and gums. Hydrolysis of these polysaccharides yield mostly glucose, mannose, galactose, arabinose, or xylose. Glucuronic acid, mannuronic acid, guluronic, and galacturonic acid are also components of some hemicelluloses. Pectin and algin are examples of the latter group referred to as the polyuronide hemicelluloses. Polyuronides are also found in some gums. For example, gum karaya is slightly acidic and is believed to contain a polyuronic acid. Synthetic methods for the commercial preparation of polyuronic acids have been reported (U.S. Pat. No. 2,156,223, P. B. Myers) in the early part of this century, but are not currently commercially available.

In considering the gums and hemicelluloses which naturally contain polyuronic acids, the pectins and algin currently have the greatest commercial availability and importance. Alginic acid is isolated from several species of brown algae by alkaline extraction. It is composed of polymers of mannopyranosyluronic acid and L-guluronic acid units. Alginic acid, which is very slightly soluble in water, as well as the water soluble sodium, potassium, ammonium, calcium and magnesium salts of alginic acid (alginates), are commercial items of trade. Alginic acid holds GRAS status specifically for, and limited to, its use in soup and soup bases. The alginates also hold GRAS status and may be used at defined maximum use levels in a variety of food applications. Since algins are not commonly an endogenous part of foods and therefore are added specifically for the purpose of thickening, little work has been reported with regard to their thermal or enzymatic degradation or hydrolysis. However, it is generally known, that alginic acid is resistant to hydrolysis. Conversely, due to the existence of pectin in most fruits and vegetables, considerable work in the area of pectins has been reported.

Commercial pectin is a carbohydrate obtained by aqueous extraction of vegetables and fruits. The most common sources of pectin today are citrus fruit, apples, and sugar beet pulp. Pectin is considered to be a linear polysaccharide having a degree of polymerization (DP), which represents the number of building blocks or galacturonic acid units in a chain-like configuration, of from a few hundred to a thousand. This corresponds to average molecular weights from about 35,000 to about 150,000. The size of the polymer being a function of the source.

Food grade pectin is composed primarily of partially methoxylated polygalacturonic acid units and some neutral sugars such as arabinose, galactose, sorbose, and rhamnose. A recent article by J. Hwang, et al., (Food Hydrolloids, Vol. 7, no. 1, pages 39–53, 1993), describes the side-chains of pectins found in different sources of pectin. These side-chains include the pentosans rhamnogalacturonan and arabinan. These side-chains are found in abundance in n apple pectin. Pectin derived from sugar beets has also been found to have some acetyl groups associated with it. In general, depending upon the degree of esterification (DE), pectins normally are classified into low methoxyl and high methoxyl content. Pectin having a DE of less than 50% is considered to be low methoxyl pectin (LMP) and pectin containing greater than 50% methoxyl groups is considered to be high methoxyl pectin (HMP). Pectinic acids (PNA) are that group of pectins containing methoxyl groups in the theoretical range of DE5 to DE95. Commercial pectins which have not been subjected to de-esterification, are high methoxyl, having a DE typically between DE65 and DE75. Pectic acid (PA) is a polygalacturonic acid with no apparent esterification of the acid group and unlike the pectinic acids which are dispersible in water, are insoluble in aqueous solutions.

Pectin as an exogenous food ingredient product, has long been recognized and utilized exclusively for its bulking, gelling, emulsifying, and thickening properties. Its primary use has been in the glassed foods (jams/jellies), bakery products, pharmaceuticals, pet foods, confections, and beverages. On the other hand, endogenous pectin in the manufacture of some food products, because of its mucilaginous, colloidal, and thickening properties, is considered undesirable. Consequently, enzymatic and thermal means are employed to hydrolyze the pectin thereby reducing the viscosity and permitting un-obstructed filtration of the food material. Probably the largest use of enzymatic degradation of pectin is in the fruit juice industry where the mucilaginous property of undegraded pectin block or foul a filter. Fruit juice treated with a pectinase no longer possesses this mucilaginous or thickening characteristic thereby allowing the juice to be filtered by either ultrafiltration techniques or filtration using a filter aid such as diatomaceous earth.

In the past, different types of degradation of pectin have been studied in the literature. Physical methods include aging, heating, and freezing. Chemical based methods include enzymatic, oxidative, acid, and alkaline. At the present time, thermal and enzymatic degradation are of primary use and importance.

Thermal hydrolysis of pectin has been done primarily as an academic exercise to aid in the elucidation of the pectin structure and understanding viscosity changes. Studies were performed by Merrill and Weeks, *J. Am. Chem. Soc.*, 67:224 (1945), by heating aqueous pectin solutions for a period of time up to 24 hours at a maximum temperature of 100° C. Based on that study, they concluded that the decrease in viscosity of heated pectin solutions was due to the breaking of primary chemical valence bonds. Kertesz, *The Pectic Substances*, p. 146–151 (Interscience Publishers, Inc., New York, N.Y., 1951) later argued that heat does not hydrolyze the glycosidic bonds but rather disrupts an aggregate structure of the pectin.

Degradation in the presence of alkali were performed in an effort to understand the degradation reactions occurring in food products containing pectin. Keijbets, *Carbohydrate Research*, 33:359–362 (1974) summarized that the heating of plant tissues under alkaline conditions or at a pH greater than 4.0 will degrade the pectin molecules by beta-elimination. This work later was confirmed by Sajjaanantakul et al., *J. of Food Science*, Volume 54, No. 5, 1989, page 1272–1277.

Enzymatic hydrolysis of pectins has recently been used to economically reduce undesirable mucilaginous or thickening properties caused by the endogenous pectins. Pectinase as obtained commercially, is not pure and contains different types of polygalacturonase (PG), polygalacturonase lyase (PGL), and pectinmethylesterase (PE). The products of enzymatic pectin hydrolysis therefore are varied and include methanol as well as high levels of galacturonic acid and the methyl ester of galacturonic acid.

There remains a need for an improved sugar acid manufactured from pectin, and a process for manufacturing such a treated pectin.

SUMMARY OF THE INVENTION

The present invention involves a process for manufacturing a treated polyuronic acid. The process involves heating an aqueous dispersion of a polyuronic acid, such as a pectin, at a temperature above about 100° C. for an amount of time sufficient to obtain a hydrolyzed, or treated, polyuronic acid mixture which separates upon standing and cooling into a clear solution, which is the hydrolyzed polyuronic acid phase, and a precipitate. The hydrolyzed polyuronic acid phase includes at least 25% of the polyuronic acid substance polymers having a degree of polymerization (DP) in the range of about DP1 to about DP20. The hydrolyzed polyuronic acid, or the treated polyuronic acid, then is recovered for use in a food product.

The hydrolyzing step, or the heating step, may include heating the aqueous dispersion at a temperature in the range of between about 100° C. to about 132° C. The hydrolyzing step may include heating the aqueous dispersion for a period of time sufficient to maximize the acid taste of the treated polyuronic acid solution minimizing the bitter or burnt taste of the solution which may be in the range of from about 20 minutes to about 5.5 hours.

The two phases may be separated using ultrafiltration, centrifugation, or a similar process. The process may further include the step of drying the treated polyuronic acid mixture to a solid having a moisture content of about five percent. Alternatively, the treated polyuronic acid mixture may be evaporated to a concentrate having a solids content of less than about 80 percent.

The invention also is the product produced by the processes described above.

DESCRIPTION OF THE PREFERRED EMBODIMENTS

The term eradicate, as used in this application, refers to the absence of the aftertaste of aspartame. This aftertaste, which is characterized as a sweet, bitter, and/or metallic flavor, continues or lingers for a period of time in excess of five seconds after the food composition containing the aspartame has exited the oral cavity.

Many chemical substances have been tested in conjunction with aspartame to determine whether these substances reduce (and more desirably, eradicate) the lingering aftertaste of aspartame detected by some people. A variety of different food ingredients having a carboxylic acid functional group such as lactic, acetic, succinic, tartaric and malic acid were tested and found to be ineffective. However, a surprising result, described in further detail below, is found using sugar acids. Unlike other weak organic acids having a free carboxylic acid group, the sugar acids are surprisingly effective in reducing and eradicating the lingering aftertaste caused by an aqueous aspartame solution. Interestingly enough, the sugar acids were not found to be effective in reducing the aftertaste associated with other non-nutritional sweeteners, specifically saccharine or cyclamate.

In general, the present invention involves compounds belonging to the general category of sugar acids, including aldonic, uronic, polyuronic, and aldaric, which have the effect of diminishing and eradicating the lingering and metallic aftertaste caused by aspartame. The compounds of the present invention are based on the aldohexoses (monosaccharide) having a carboxylic acid group at the aldehydic carbon, (C-1), the primary hydroxyl carbon group (C-6), or at both positions. Such compounds are discovered to have the ability to eradicate the lingering aftertaste of aspartame. The compounds in the above categories which are commonly available are shown in the following Table 1:

TABLE I

| Commonly Available Sugar Acids and Location of the Effective Carboxylic Acid Group | | | |
|---|---|---|---|
| aldonic | uronic | polyuronic | aldaric |
| C-1 | C-6 | C-6 | C-1 and C-6 |
| gluconic | glucuronic | | glucaric (saccharic) |
| | galacturonic | pectinic, pectic acids | galactaric |
| | mannuronic | alginic acid | |

While the above sugar acids are available, each particular sugar acid may not be suited for use in all food and beverage systems containing aspartame due to inherent physical properties. For example, the aldaric acids exist commercially as the salts and are insoluble and ineffective as such. Polygalacturonic acid (pectic acid) and alginic acid are relatively insoluble in water. Mannuronic acid is insoluble at pH less than 3. Therefore, use of these acids in clarified beverages due to precipitation would be unacceptable, whereas the use of these acids in certain food compositions such as puddings, is acceptable. Hydrolysis or synthesis of polymers of the sugar acids so as to produce shorter polymer chains which might have improved solubility is possible and a consideration, but the relative cost, technology, and unavailability make this alternative impractical at the present time.

Another physical property of sugar acids that may be considered undesirable in food systems and which is characteristic of polyuronic acids that are pectins, is the mucilaginous or viscosity building characteristics at concentrations of greater than 100 mg percent by weight. In carbonated beverages, such an increase in viscosity, pulp volume, and mucilaginous property would be undesirable. Thus, selection of an appropriate sugar acid depends on the food or beverage product with which the sugar acid is being used.

The monomeric sugar acids gluconic, glucuronic, and galacturonic, are the most commonly available. Unfortunately, at the present time, these acids would require FDA approval for use as food additives. We were able to successfully utilize these monomeric sugar acids at levels of about 15–30 mg % in aqueous solutions containing 100 mg % aspartame. As used herein, mg percent is defined as mg per 100 cc. At such concentrations, these sugar acids have the desired affect on eradicating the lingering aspartame aftertaste. However, it was noticed that at the concentration necessary to eradicate the lingering aftertaste, the monomeric sugar acids, at least in aqueous systems, started to contribute an undesirable sharp acid aftertaste of their own.

Alginic acid we found to be quite effective in eradicating the lingering aftertaste of aspartame requiring less than 3 mg % in an aqueous solution containing 100 mg % aspartame. However, the alginic acid was not soluble and existed as a suspension. The use of alginic acid in puddings tended to strongly potentiate and alter the flavorings commonly used in puddings. It is possible, of course, that other more suitable flavors may be found. At the current time, according to the U.S. Codes of Federal Regulation, Title 21, alginic acid is suitable for use only in soups or soup bases.

We found that pectin also has the ability to eradicate the aftertaste of aspartame. However, it was found that commercial pectins are considerably less effective than the monomeric sugar acids, requiring 120 mg % as compared to 15 mg %, respectively, in an aqueous solution containing 100 mg % of aspartame. To our surprise, we discovered that this same pectin subjected to thermal treatment, according to the processes described in further detail below, produced a "treated" pectinic acid, which may be termed as a pectin syrup, that was equally as effective (requiring the same concentration) as the monomeric sugar acids. Unexpectedly, it was found that the concentration of monomeric sugar acid (galacturonic acid) in these treated pectins was only about 0.2 to 5 percent. It is obvious, that we discovered that the pectinic acids resulting from the described thermal processes, are as effective as the monomeric acids in eradicating the lingering aftertaste of aspartame. However, unlike the monomeric sugar acids, it was found that these treated pectinic acids at the levels necessary to eradicate the lingering aftertaste, do not posses a sharp acid after-taste as do the monomeric acids. These treated pectinic acids were used advantageously over commercially available pectins in all food and beverage formulations requiring clarity and no contribution to viscosity or pulp volume.

A comparative taste evaluation of sugar acids was performed and the results of that evaluation are shown below in Table 2. For that study, an aqueous solution containing 100 mg % weight per weight aspartame was prepared and stored in the refrigerator for 48 hours before using. To 100 cc of this solution was added an amount of a sugar acid. The concentrations were varied by 1 to 5 mg increments and the resulting solutions evaluated by a panel of taste testers for the presence of a lingering aftertaste associated with aspartame, as well as any detectable off-flavors. The results summarized in Table 2 are the minimum quantity of sugar acid necessary to eradicate the lingering aftertaste of the aspartame. At the concentration found to eradicate the aftertaste, any off-tastes or other physical properties attributed to the sugar acid was noted.

TABLE 2

COMPARATIVE TASTE EVALUATION OF SUGAR ACIDS

| Sugar acid | Min. sugar acid dry basis found to eradicate lingering aftertaste | Off-flavors at the min. % sugar acid | Other properties at the min. % acid |
|---|---|---|---|
| Gluconic | 30 mg % | sharp acid | none |
| Glucuronic | 15 mg % | sharp acid | none |
| Galacturonic | 15 mg % | sharp acid | none |
| Polygalact-uronic acid | 15 mg % | none | insoluble |
| Pectin (HM) | 100–120 mg % | off-flavor | increased viscosity, cloudiness, and pulp volume |
| Alginic acid | 2 mg % | none | insoluble |
| Treated pectin | 15–55 mg % | none | none |

Relatively large quantities, greater than 100 mg %, of commercially available pectin, are required to eradicate the aftertaste of aspartame as compared with monomeric sugar acids. At the minimum concentration required for pectins, a distinct cloudiness or translucency, and contribution to the overall viscosity and pulp volume of the solution, is observed. These pectins, at the effective concentration, also tend to contribute a distinct flavor which may not be compatible in many applications. Consequently, we found the use of commercial pectins to be unsatisfactory in beverage systems requiring clarity or limited viscosities. High flavored beverage or food systems having a translucent or opaque character or containing or having the ability to sustain the increase in viscosity and pulp volume caused by the levels of pectin necessary to eradicate the aftertaste of the aspartame, may have success in its use. However, these latter applications are somewhat limited.

However, the use of treated pectins, as described in further detail below, are found to have no off-flavors and are soluble in a concentration of 15–55 mg %. The monomeric acids, while requiring a substantially lower concentration to eradicate the lingering aftertaste of aspartame, also produced a distinctive off-taste noted in the solution. The insolubility or inherent sharp acid flavor of some sugar acids make them undesirable for food product applications which require clarity or have a flavor profile which is incompatible with a sharp acid flavor. Consequently, selection of the appropriate sugar acid is dependent upon the nature of the food composition in which the sugar acid is to be used. The amount of sugar acid that is to be used in a food product application is dependent upon the sugar acid utilized and the nature of the other constituents in the food product which may interfere or possibly accentuate the effects of the sugar acid on the aspartame.

The relative amount of sugar acid concentration to aspartame concentration in a food sweetener composition is a function of the effectiveness of the sugar acid that is being used. It is recognized, that the ratio as determined simply in aqueous systems, provides a starting point of the relative amounts of sugar acids to aspartame that may be required. Understandably, an appropriate adjustment to this ratio can readily be made for more complex food systems which are comprised of any or all of the following: flavors, proteins, fats, and carbohydrates.

Appropriate sugar acids are readily added to food or beverage systems which already contain aspartame to eradicate the existing lingering aftertaste of aspartame. The choice of sugar acid is dependent on the food or beverage system, its clarity and pH, as well as the desirable or undesirable physical properties that may be contributed by the sugar acids.

Fruit and vegetable products that naturally contain endogenous pectin do not possess pectin in sufficient quantities to eradicate the lingering aftertaste of certain concentrations of aspartame that may be added. Examples of this are given in Table 3 below. Products were chosen that contain pectin endogenous to the fruit or vegetable and which were subjected to a moderate thermal and enzymatic treatment during the canning process. For this purpose, V-8 Vegetable drink and frozen orange juice were selected and evaluated. In Table 3, a designation of "−" indicates no lingering aftertaste is detected, and a designation of "+" indicates the presence of a lingering aftertaste.

TABLE 3

CONCENTRATION OF ASPARTAME VERSUS PRESENCE OF LINGERING AFTERTASTE IN FOOD PRODUCTS INHERENTLY CONTAINING PECTIN

| Concentration of aspartame added (mg percent) | V-8 Vegetable drink | Reconstituted frozen orange juice |
|---|---|---|
| 5 | − | − |
| 15 | − | − |
| 20 | − | − |
| 25 | + | − |
| 30 | + | − |
| 35 | + | + |
| 50 | + | + |

The data shown above in Table 3 establishes a maximum level of aspartame that can be added to a product containing endogenous pectin without having to add any additional sugar acids to eradicate the lingering aftertaste associated with aspartame. At 100% juice, these beverages have sufficient pectin material to eradicate the lingering aftertaste of 25 mg % added aspartame for V-8 Vegetable Juice and 35 mg % added aspartame for reconstituted (single strength) orange juice. It is understood, that if these fruit juices were diluted with water such that the fruit or vegetable juice constituted a fraction of the resulting beverage, the addition of aspartame to achieve the desired sweetness, would require the addition of exogenous sugar acid. For example, if a beverage contained 10% orange juice, aspartame levels of greater than 3.5 mg % would require the use of exogenous sugar acids to eradicate the lingering aftertaste of aspartame; at 50% orange juice, aspartame levels greater than 17.5 mg % would require the use of exogenous sugar acids, and so on.

Treated Pectinic Acids

As mentioned above, "treated" pectin, as a source of sugar acid, was found to have physical properties and effectiveness superior to those of other sugar acids. We will now describe these treated pectinic acids and processes by which they can be made.

Pectins may be dispersed in water using a high sheer mixer, such as a Waring type blender. Dispersions of 5 to 10% dry pectin to water are preferable. Lower than 5% are certainly possible but less economical. Dispersions of from 5 to 10% pectin, are best accomplished by elevating the water temperature to between 60° C. and 80° C. Dispersions greater than 10% due to their excessive viscosity, require an extremely high sheer force to disperse the pectin, and are very difficult to pump.

The present invention involves subjecting an aqueous dispersion of polyuronides, preferably pectin, obtained from natural sources to a novel thermal treatment described in detail below, whereby not only is the viscosity greatly reduced, but novelly, the resulting aqueous mixture containing the uronic acid and its polymers, actually separate upon cooling and standing into a clear supernatant solution and a precipitate that can be further separated by decantation, centrifugation or filtration. The precipitate being comprised of calcium pectate, protein and pentosans. The analysis and descriptions of aqueous pectin dispersions, treated and untreated are given in TABLE 4 below. The treated pectin dispersions being subjected to thermal condition as defined.

High Pressure Ion Chromatography (HPIC) may be utilized to determine the size and amounts of galacturonic acid and its polymers. The Degree of Polymerization (DP) refers to the number of anhydrogalacturonic acid units in a given polymer. For example, galacturonic acid is referred to as DP1, whereas a polymer consisting of four anhydrogalacturonic acid units would be referred to as DP4. The HPIC analysis as described in detail below, is capable of quantitatively determining DP1 to DP20.

In a preferred embodiment, and as used in the examples provided below, the HPIC determinations are made using a DIONEX™ BIO-LC equipped with a Pulsed Amperometric Detector (PAD), a DIONEX Gradient Pump, and a Dionex Degas Module. A Spectra-Physics Integrator Model #4270 is utilized for integration purposes. The column is a Carbo-Pac I™. A 25 microliter injection loop is used. Helium is used as the inert gas chosen for the Degas Module and valve operation. Eluant A is a 0.1N sodium hydroxide solution. Eluant B is a 0.1N sodium hydroxide, 1.0N sodium acetate solution. The gradient is 0–30% Eluant B in 30 minutes. Under these conditions galacturonic acid has a retention time (RT) value of 12.2 minutes. The polymers between DP2 and DP30 appear as individual peaks having an RT between about 16.5 and 34.0.

The response factor for DP1 is determined using known quantitative amounts of DP1. Since the PAD operates under the premise of the Nernst equation, the electrical impulse response is dependent on molar values rather that percent gram weight, as in RI detectors. It therefore is assumed that the response value is a direct function of molecular weight and subsequently may be adjusted accordingly for each polymer specie ($DP_N$) respective to the known response value for DP1. The area of a peak integrated divided by the calculated response factor, yields a corrected integrated value that may be used to determine a quantitative value for an individual peak. In this way, the relative composition of the polyuronic acid dispersions and mixtures are determined.

Thermal degradation of pectin as described in the literature, involved long periods of time (less than 24 hours) at temperatures below 100° C., to effectively reduce the viscosity of an aqueous pectin solution. We observed that a 5% aqueous pectin solution subjected to 24 hours at 100° C., resulted in a pectin dispersion having a reduced viscosity and having an appearance that was translucent and cloudy even after centrifugation for two minutes at a force 1380 times that of gravity. Comparing the analysis of a pectin dispersion with no thermal treatment with that of a dispersion subjected to 100° C. for 24 hours, indicates the primary difference is that of viscosity, which has been decreased. It is also notable that there is no apparent galacturonic acid (GA) and polymers of galacturonic acid in the detectable range of the HPIC. Clarity of the dispersion has not been improved and its effectiveness in eradicating the lingering aftertaste of aspartame only slightly increased, requiring a usage level of only about 100 mg % versus about 120 mg %.

We found that treatment of a 5% aqueous pectin dispersion at a temperature of 120° C. for 1 hour, produced a pectinic acid mixture containing insoluble compounds that separated upon cooling and standing, to form a clear supernatant (pectinic acid solution) and precipitate. This treated mixture may be effectively utilized as such. However, since clarity is desirable in many food applications, most notably beverages, it is preferable to remove the precipitate by decantation, centrifugation, and/or filtration. We found that, depending on temperature, in excess of 100° C., the time required for the aqueous pectin dispersion to convert into a mixture containing a solution and precipitate that separate upon cooling and standing, ranges from 1 to 6 hours. After removal of the precipitate, the thermally treated pectin solution may be described in terms of clarity, low viscosity, polydispersity, intensified acid flavor with little or no bitter notes, and superior effectiveness in eradicating the lingering aftertaste of aspartame. Excessive heat treatment, beyond that necessary to allow the dispersion to separate upon cooling and standing into a solution and precipitate, and allowing for the development of increased acid flavor, results in the development of bitter off-flavors.

It is preferable to obtain the maximum acid taste with the minimum of bitter flavor. The bitter flavor may be described as being caramel or burnt in nature and eventually, if predominant bitter notes exist in the sugar acid, then, at the use level necessary to eradicate the lingering aftertaste of aspartame, becomes detectable in the food compositions. It is preferable to develop, by thermal treatment above 100° C., a clear solution which has maximum effectiveness (requiring the least amount of treated pectinic acid as a percentage of aspartame), with the minimum amount of contributory off-taste that may be described as bitter, caramel, or burnt.

In Table 4, clarity of the pectinic acid solution described after the mixture has been centrifuged for two minutes at a force of 1380 G's followed by decantation to remove the precipitate. The data reported in Table 4 indicate that heating in excess of 100° C. causes significant changes to the pectin dispersion. After removal of the precipitate, clarity of the solution is profound and the viscosity is decreased to less than 100 cps. The titratable acidity was found to be about the same, indicating that little demethoxylation has occurred. The HPIC data indicate the increase in detectable polymers upon additional heat treatment in excess of 100° C.

We have found that high temperatures in excess of 100° C. promote the precipitation of calcium pectinates upon cooling and after separation, leaves a clear solution having a viscosity of less than 100 cps. This solution comprised of galacturonic acid and its detectable polymers of from DP2 through DP20 may then be further concentrated by the removal of water to a syrup of 5 to 80%, more preferably 20 to 60% solids basis, and/or dried preferably by spray drying or drum drying, to form a solid product.

We have further found that the GA monomer has about the same effectiveness as the polymers resulting from the thermal degradation of pectin on a weight for weight basis in eradicating the lingering aftertaste of aspartame. However, unlike the monomer, the thermally treated pectin of this invention, did not possess the sharp acid flavor that is inherent in the monomer acid. The pectinic acid polymer therefore, resulting from the described thermal treatment, was considered to be preferential over the monomer.

Pectin from different sources are known to have different molecular weights. We found that apple pectin for example, when subjected to the thermal process of this invention, produced a pectinic acid solution that was more effective than the thermally treated pectinic acid solution resulting from citrus pectin. Unfortunately, there were some other off-flavors associated with the apple pectin. The thermally treated apple pectins were found to have about the same levels of GA, but significantly greater levels of, polymers in the range of DP2 to DP20. The treated apple pectin was also found to have a considerable number of molecules, visible in the HPIC data but not identified, having a retention time below that of GA. Some of the off-flavors detected were believed to be associated with these peaks.

A summary of the physical properties of aqueous pectin solutions are given in TABLE 4 below. The data demonstrates the changes in physical properties, and effectiveness of the pectin towards aspartame, upon thermal and or enzymatic treatment as described in this application as compared with no treatment or conventional treatment as has been described in the literature.

TABLE 4

PROPERTIES OF 5% AQUEOUS PECTIN SOLUTIONS
(Treated and Untreated)

| | Time hours | | | |
|---|---|---|---|---|
| 0 | 24 | 5.5 | 0.3 | 3 |
| | | | temp. °C. | |
| 25 | 98 | 105 | 132 | 120 |
| | | | treatment | |
| none | none | TH | TH | TH |
| GA | 0 | 0 | 0.3 | 0.2 | 1.5 |
| DP 2-20 | 0 | 0 | 3.9 | 2.7 | 45.2 |
| pH | 3.6 | 3.2 | 3.2 | 3.2 | 3.2 |
| viscosity (cps)[6] | 11,600[1] | 3,430[2] | 35.5 | 15.0 | 7.0 |
| clarity | cloudy | cloudy | clear | clear | clear |
| mg % to eradicate aftertaste[7] | 120 | 100 | 55 | 55 | 30 |
| off-flavors[8] | yes | yes | none | none | none |

[1]Brookfield viscometer, 50 rpm, spindle #6, 24° C.
[2]Brookfield viscometer, 100 rpm, spindle #5, 24° C.
[3]Brookfield viscometer, 20 rpm, spindle #1, 20° C.
[4]100 cc of 100 mg % aspartame aqueous solution; mg percent sugar acid required to eradicate the lingering aftertaste of the aspartame.
[5]Observed in the sugar acid treated aspartame solution.

The following examples are illustrative of the following: food sweetener compositions containing sugar acids and aspartame; uses of these food sweetener compositions in food products; use of sugar acids in food products containing aspartame; and process for preparing treated pectinic acid solutions embodying the present invention. The following examples illustrate that different sugar acids may be used in various food sweetener compositions and food products. These examples also illustrate that the sugar acid or sweetener composition, may exist and be used in a syrup or a dried form, depending on the food product and convenience in formulations. The sugar acids may be obtained from commercially available methods or sources and used as such or by subjecting pectin to the thermal and/or enzymatic treatment as described in this application. These examples are not to be construed as limiting, but merely demonstrate exemplary processes, compositions, and uses in food products incorporating the present invention.

EXEMPLIFICATION

I. Food Sweetener Compositions

EXAMPLE 1

Dry Food Sweetener Composition

A. Add 15 grams of GA to 100 grams of aspartame. The two powders are blended thoroughly to yield a homogenous and uniform appearance. The final product being comprised of 13% GA and 87% aspartame on a dry solids basis.

B. Blend 32 grams of aspartame with 100 grams of thermally treated pectinic acid solution having 4.8% soluble solids obtained from the process described in detail in Example 9. The mixture is placed in a shallow pan and allowed to dry overnight in an air oven at 32° C. The dried blend then is pulverized to a fine powder to be used as a food sweetener composition. The final product being comprised of 13% treated pectinic acid and 87% aspartame on a dry solids basis.

Due to the intensity of the sweetness of aspartame, a food sweetener composition suitable for more commercial applications may be manufactured by diluting and therefore bulking the aforementioned food sweetener compositions with starches, dextrins, fibers such as cellulose or similar ingredients to improve the bulk density and serving size of the food sweetener composition.

EXAMPLE 2

Liquid Food Sweetener Composition

Gluconic acid (50% aqueous solution from Sigma Chemical Company, St. Louis, Mo.), 0.6 gram, is blended with 99.4 grams of an aqueous solution containing 1 gram of aspartame. This liquid food sweetener composition may be used in food applications (See, e.g., Example 4). The final composition being comprised of 23% gluconic acid and 77% aspartame on a dry solids basis. This liquid food sweetener composition then is stored under refrigerated conditions.

Liquid food sweetener compositions for commercial applications are dependent upon concentration. For example, some consumers prefer using a few drops of sugar substitute or liquid sweetener to achieve the desired sweetness. Other consumers prefer using a teaspoon such as with honey or maple syrup. For this reason, it is understood that the liquid sweetener composition may be concentrated to any desired amount. Also, preservatives may be added to the liquid sweetener composition to alleviate the necessity of storing the composition under refrigerated conditions.

II. Use of Food Sweetener Compositions

EXAMPLE 3

Gelatin Food Product

One envelope of Knox brand Unflavored Gelatin, sufficient to gel 2 cups of liquid, is dry blended with 0.5 gram of the dry food sweetener composition described above in Example 1B. Dried flavoring, such as lemon, also may be added. This blend then is repackaged as an aspartame sweetened flavored gelatin dessert mix.

The above mix then may be blended with ¼ cup of cold water and allowed to stand for two minutes. One and ¾ cups of boiling water is added and mixed at high speed in a Waringtype blender. The gelatin dessert is allowed to cool in a standard refrigerator for at least about 3 hours, or until sufficiently solidified.

Tasting of such a gelatin dessert reveals no lingering aftertaste normally associated with gelatin desserts containing aspartame.

EXAMPLE 4

Sweetener for Iced Tea Commercially available, unsweetened instant ice tea is prepared according to manufacturer's instruction. Add about 10 cc of the liquid sweetener composition described in Example 2 to an 8 ounce glass of this ice tea. The treated tea may then be evaluated for lingering aftertaste commonly associated with instant teas sweetened with aspartame. There is no lingering aftertaste associated with the aspartame in the product of this Example.

III. Use of Sugar Acids in Food Compositions Containing Aspartame

The following examples represent food compositions containing aspartame to which a sugar acid is added. Different sugar acids may be used alone or in combination with food formulations containing aspartame. For example, a dried thermally treated pectinic acid and/or galacturonic may readily be blended into an instant gelatin dessert mix that contains aspartame as the sweetener. Alternatively, a syrup form of a thermally treated pectinic acid syrup may be used in a flavor syrup of a diet beverage which is formulated with aspartame as the sweetener.

EXAMPLE 5

Use in Diet Beverages

Dried pectin syrup obtained from Example 9 was blended with the different diet beverages which contain aspartame. Table 5 below indicates the quantity of dried pectin syrup, per 100 cc of diet beverage, found to eradicate the lingering aftertaste of aspartame which these beverages normally exhibit.

TABLE 5

QUANTITY OF DRIED PECTIN SYRUP FOUND TO ERADICATE LINGERING AFTERTASTE OF ASPARTAME

| Diet Beverage Containing Aspartame | % Dried Pectin Syrup to Eradicate Aftertaste |
|---|---|
| Diet Pepsi ™ | 0.07 |
| Diet Coke ™ | 0.05 |
| Diet Shasta ™ (lemon-lime) | 0.12 |
| 7-UP ™ | 0.06 |
| A&W Rootbeer ™ | 0.04 |
| Diet RC ™ Cola | 0.06 |
| Diet Slice ™ Mandarin-Orange | 0.06 |

It is understood that the concentrations of treated pectinic acid found to eradicate the aftertaste of aspartame in the diet beverages above are subject to the discrimination of the taste panel. It is possible that other taste panels may prefer slightly more or less sugar acid.

EXAMPLE 6

Use of Treated Pectinic Acid in Starch Based Puddings Containing Aspartame

A starch based pudding containing aspartame having the following formulation below is prepared.

| Rice Starch | 35.0 gram |
|---|---|
| carrageenan | 1.5 gram |
| water | 457.0 gram |
| lemon flavoring | 6.5 gram |
| aspartame | 1.0 gram |

All ingredients with the exception of aspartame and the sugar acid are blended and then heated to 82° C. The pudding then is cooled to 50° C. and the aspartame added. The pudding is divided into two portions containing 250 grams each. To one portion, which contains a total of 0.5 gram aspartame, is added 0.15 gram of the dried treated pectinic acid of Example 9. Both portions again are mixed and allowed to cool under refrigerated conditions for about twenty-four hours. Both portions of the pudding are then evaluated for the presence of a lingering aftertaste. It was found that the pudding containing the treated pectinic acid does not have the lingering aftertaste normally associated with aspartame. The pudding portion without the sugar acid has the lingering aftertaste normally associated with aspartame.

EXAMPLE 7

Use of GA in a Gelatin Dessert Mix Formulation Containing Aspartame

Two packages of Sugar Free Jello™Brand Gelatin Dessert containing Nutrasweet™as the sweetener source, preferably flavored, are utilized for this example. To one package (9.5 grams) of the dry mix is added about 0.26 gram of GA (Sigma Chemical Co., St. Louis, Mo). Both mixes are prepared according to directions on the gelatin dessert box.

A taste evaluation of both products reveals that the gelatin dessert containing the added sugar acid does not have the lingering aftertaste associated with aspartame. The sample without the sugar acid does have the distinct lingering aftertaste commonly associated with aspartame.

IV. Process for manufacturing Treated Pectinic Acid

EXAMPLE 8

Thermally Treated Pectinic Acid Mixture

A 5% aqueous pectin dispersion is prepared by weighing out about 50 grams of commercial PECTIN 1400 HM citrus pectin obtained from Grinstead, Industrial Airport, Kansas, and briefly (approximately 30 seconds) blending the pectin with 450 grams of water in a high sheer mixer such as a Waring-type blender. The dispersion is transferred to a thermal-resistant glass container and heated at a temperature of about 105° C. for about 5.5 hours. At the end of the heat treatment period, the substance is allowed to cool to room temperature. The mixture, which includes a clear solution and a precipitate which readily separates and settles to the bottom of the container upon standing, has the following characteristics:

| Soluble Solids (by refractometer) | 4.8% |
|---|---|
| HPIC | |
| GA | 0.3% |
| DP2-20 | 3.9% |
| Taste | Pleasant acid (stronger than initial solution) |

Other characteristics are noted in TABLE 4, above.

EXAMPLE 9

Thermally Treated Pectinic Acid Solution

A 6.25% aqueous pectin dispersion was prepared by weighing out about 40 pounds of commercial PECTIN 1400 HM citrus pectin obtained from Grinstead, Industrial Airport, Kansas, and blending it with about 600 pounds of water in a high sheer mixer such as a Breedo™ for 10 minutes. The dispersion then is heated via steam injection to 132° C. and held in a stainless steel pressure vessel for about 90 minutes. At the end of the heat treatment period, the treated mixture is removed from the tank and allowed to cool to 80° C. The mixture is subjected to ultrafiltration using a tangential flow type filter with a 1000 angstrom membrane. The clear solution has the following characteristics:

| Soluble Solids (by refractometer) | 4.8% |
|---|---|
| HPIC | |
| GA | 0.7% |
| DP2-20 | 11.6% |
| Taste | Pleasant acid (stronger than initial solution) |
| viscosity[9] | 16.0 cps |
| clarity | clear |

[9]Brookfield, spindle #1, 20 rpm, 20° C.

The solution is concentrated by evaporation of the water to produce a treated pectinic acid syrup having a soluble solids of 25.6%.

Two 10 gallon portions of this syrup are subjected to further drying. Spray drying by conventional methods yields a light brown powder having a bulk density of about 0.35 gram/cc. Drum drying of the syrup by conventional drum drying methods results in a light brown powder that is 100% through a U.S. sieve, 14 mesh. The drum dried product has a bulk density of 0.14 gram/cc.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A process for manufacturing a treated polyuronic acid, the process comprising the steps of:

A. heating an aqueous dispersion of a polyuronic acid at a temperature above about 100° C. and for an amount of time sufficient to obtain a separation of the dispersion into two phases upon cooling, the two phases being a treated polyuronic acid solution and a precipitate; and B. recovering the treated polyuronic acid mixture, including at least 2.5 percent polymers of the polyuronic acid having a degree of polymerization DP in the range of about DP1 to about DP20.

2. The process of claim 1, wherein the polyuronic substance is a pectin and the treated polyuronic acid mixture is a treated pectinic acid.

3. The process of claim 1, further comprising a step of further separating the treated polyuronic acid mixture from the precipitate.

4. The process of claim 3, wherein the step of separating the treated polyuronic acid mixture comprises ultrafiltration.

5. The process of claim 3, wherein the step of separating the treated polyuronic acid mixture comprises centrifugation.

6. The process of claim 1, where inn the treated polyuronic acid mixture, adjusted to 5% solids by weight, has a Brookfield viscosity less than about 100 cps between 15 C and 24 C.

7. The process of claim 1, wherein the heating step further comprises heating the polyuronic acid dispersion at a temperature and for an amount of time sufficient to maximize an acid taste and to minimize a bitter taste of the polyuronic acid solution.

8. The process of claim 1, wherein the polyuronic acid dispersion comprises less than about 10 percent polyuronic acid substance.

9. The process of claim 1, wherein the heating step further comprises heating the polyuronic acid dispersion at a temperature in the range of about 100° C. to about 132° C.

10. The process of claim 9, wherein the step of heating the polyuronic acid dispersion further comprises heating the dispersion for an amount of time of about 20 minutes to about 5.5 hours.

11. The process of claim 1, further comprising the step of drying the treated polyuronic acid mixture to a solid having a moisture content of about 5 percent.

12. The process of claim 3, further comprising the step of drying the treated polyuronic solution to a solid having a moisture content of about 5 percent.

13. The process of claim 1, further comprising the step of evaporating the treated polyuronic mixture to a concentrate having a solids content less than about 80 percent by weight.

14. The process of claim 3, further comprising the step of evaporating the treated polyuronic solution to a concentrate having a solids content less than about 80 percent by weight.

15. A treated polyuronic acid product formed by a method comprising the steps of:

A. heating an aqueous dispersion of a polyuronic acid at a temperature above about 100° C. and for an amount of time sufficient to obtain a separation of the dispersion into two phases upon cooling, the two phases being a treated polyuronic acid solution and a precipitate; and B. recovering the treated polyuronic acid mixture, including at least 2.5 percent polymers of the polyuronic acid having a degree of polymerization DP in the range of about DP1 to about DP20.

16. The polyuronic acid product of claim 15, wherein the method further comprises hydrolyzing the polyuronic acid polymers so that at least 2.5% of the polyuronic acid substance is in the range of DP1 to DP20.

17. The polyuronic acid product of claim 15, wherein the method further comprises a step of dehydrating the polyuronic acid product to produce a polyuronic acid solid.

18. The polyuronic acid product of claim 15, wherein the method further comprises a step of evaporation of the polyuronic acid product to produce a polyuronic acid syrup having a solids content of up to 80%.

19. The polyuronic acid product of claim 15, wherein the polyuronic acid substance is pectin.

* * * * *